US012146637B1

(12) United States Patent
Lin

(10) Patent No.: US 12,146,637 B1
(45) Date of Patent: Nov. 19, 2024

(54) LAMP HOLDER DEVICE, LAMP, AND LIGHTING CONTROL METHOD

(71) Applicant: Luxshare Precision Industry Company Limited, Shenzhen (CN)

(72) Inventor: Jhih-Li Lin, Shenzhen (CN)

(73) Assignee: LUXSHARE PRECISION INDUSTRY COMPANY LIMITED, Shenzhen (CN)

(*) Notice: Subject to any disclaimer, the term of this patent is extended or adjusted under 35 U.S.C. 154(b) by 0 days.

(21) Appl. No.: 18/583,432

(22) Filed: Feb. 21, 2024

(30) Foreign Application Priority Data

Jul. 14, 2023 (CN) ......................... 202310872626.0

(51) Int. Cl.

| | |
|---|---|
| ***F21V 14/04*** | (2006.01) |
| ***F21V 7/09*** | (2006.01) |
| ***H05B 47/125*** | (2020.01) |
| ***H05B 47/13*** | (2020.01) |
| *F21Y 103/10* | (2016.01) |
| *F21Y 115/10* | (2016.01) |

(52) U.S. Cl.

CPC ................ *F21V 14/04* (2013.01); *F21V 7/09* (2013.01); *H05B 47/125* (2020.01); *H05B 47/13* (2020.01); *F21Y 2103/10* (2016.08); *F21Y 2115/10* (2016.08)

(58) Field of Classification Search

CPC ........... F21V 7/09; F21V 14/04; H05B 47/13; H05B 47/125

See application file for complete search history.

(56) References Cited

U.S. PATENT DOCUMENTS

2010/0265716 A1* 10/2010 Hood ...................... F21V 14/04 362/385

FOREIGN PATENT DOCUMENTS

CN 105953125 A * 9/2016 .............. F21S 6/003
CN 110486645 A 11/2019

* cited by examiner

*Primary Examiner* — Evan P Dzierzynski
*Assistant Examiner* — Nathaniel J Lee
(74) *Attorney, Agent, or Firm* — Birch, Stewart, Kolasch & Birch, LLP

(57) ABSTRACT

A lamp holder device is provided. The lamp holder device includes a sector-shaped shell, an LED lamp plate, a motor component, a light reflecting component, a camera shooting component, an infrared light compensating component, and a microprocessor. The motor component is embedded at a center position of the sector-shaped shell. The light reflecting component includes a circular part connected to a center position of the motor component and a long plate part, and the length of the long plate part is the same as a radius length of the sector-shaped shell. The microprocessor determines a rotation angle of the motor component based on the camera shooting component and the infrared light compensating component through an eye tracking technology, and controls the motor component to rotate to drive the light reflecting component to rotate so as to change an angle of light emission.

20 Claims, 4 Drawing Sheets

LAMP HOLDER DEVICE, LAMP, AND LIGHTING CONTROL METHOD

CROSS-REFERENCE TO RELATED APPLICATION(S)

This application claims priority to the Chinese Patent Application No. 202310872626.0 filed on Jul. 14, 2023, the disclosure of which is incorporated herein by reference in its entirety.

TECHNICAL FIELD

Embodiments of the present disclosure relate to the field of intelligent control technology, in particular to a lamp holder device, a lamp, and a lighting control method.

BACKGROUND

The human eye is an organ that senses light, and long-term overuse of the eye in environments with insufficient light is the main cause of myopia. Most commonly used lamps are installed fixedly, with fixed lighting regions that cannot meet the lighting needs of users when their field of view changes.

To address the above issue, the conventional lamps are equipped with adjustable structures. When a user's field of view changes, the user needs to manually adjust the height of a lamp pole or turn the direction of a lamp holder to change the lighting region. In one aspect, manually changing the lighting region is not convenient enough, which adversely affects the user's experience of using; in another aspect, changing the lighting region by adjusting the height of the lamp pole or turning the direction of the lamp holder results in poor effect of spotlight angle adjustment.

SUMMARY

A lamp holder device, a lamp, and a lighting control method are provided according to the present disclosure to address the issues of inconvenient caused by requiring manually adjusting the height of the lamp pole or turning the lamp holder direction to change the lighting region and poor effect of spotlight angle adjustment in the conventional technology.

According to one aspect of the present disclosure, a lamp holder device is provided, which includes a sector-shaped shell, an LED lamp plate, a motor component, a light reflecting component, a camera shooting component, an infrared light compensating component and a microprocessor.

The LED lamp plate is provided at an opening position of the sector-shaped shell, and the motor component is embedded at a center position of the sector-shaped shell. The light reflecting component includes a circular part and a long plate part, the circular part is connected to a center position of the motor component, and the length of the long plate part is the same as a radius length of the sector-shaped shell. The microprocessor is arranged in the lamp holder device.

The microprocessor is configured to determine a rotation angle of the motor component based on the camera shooting component and the infrared light compensating component through an eye tracking technology, and control the motor component to rotate to drive the light reflecting component to rotate so as to change an angle of light emission.

According to another aspect of the present disclosure, a lamp is provided, which includes the lamp holder device as described in the one aspect of the present disclosure and a lamp base.

According to another aspect of the present disclosure, a lighting control method is provided, which includes as follows.

An infrared light compensating component is controlled to emit infrared light to a user's eyes, and then a camera shooting component is controlled to collect an eye image of the user.

A position where the user's eyes are gazing is determined based on the eye image. A rotation angle of a motor component is determined based on the position.

The motor component is controlled to rotate to drive a light reflecting component to move to change an angle of light emission.

In the technical solutions of the embodiments of the present disclosure, the microprocessor determines the rotation angle of the motor component based on the camera shooting component and the infrared light compensating component through an eye tracking technology, and controls the motor component to rotate to drive the light reflecting component to rotate so as to change the angle of light emission, which addresses the issues of inconvenient caused by requiring manually adjusting the height of the lamp pole or turning the lamp holder direction to change the lighting region and poor effect of spotlight angle adjustment in the conventional technology, achieves the beneficial effects of automatically changing the lighting region according to the user's gaze direction and effectively improving the spotlight angle adjustment effect.

It is to be understood that the contents described in this part are not intended to identify key or important features of the embodiments of the present disclosure, rather than limiting the scope of the present disclosure. Other features of the present disclosure will become readily understood through the description hereinafter.

BRIEF DESCRIPTION OF DRAWINGS

To illustrate technical solutions in embodiments of the present disclosure more clearly, drawings used in description of the embodiments are briefly described hereinafter. Apparently, the drawings described below merely illustrate some embodiments of the present disclosure, and the person of ordinary skill in the art can obtain other drawings based on these drawings on the premise that no creative efforts are made.

Figure 6:
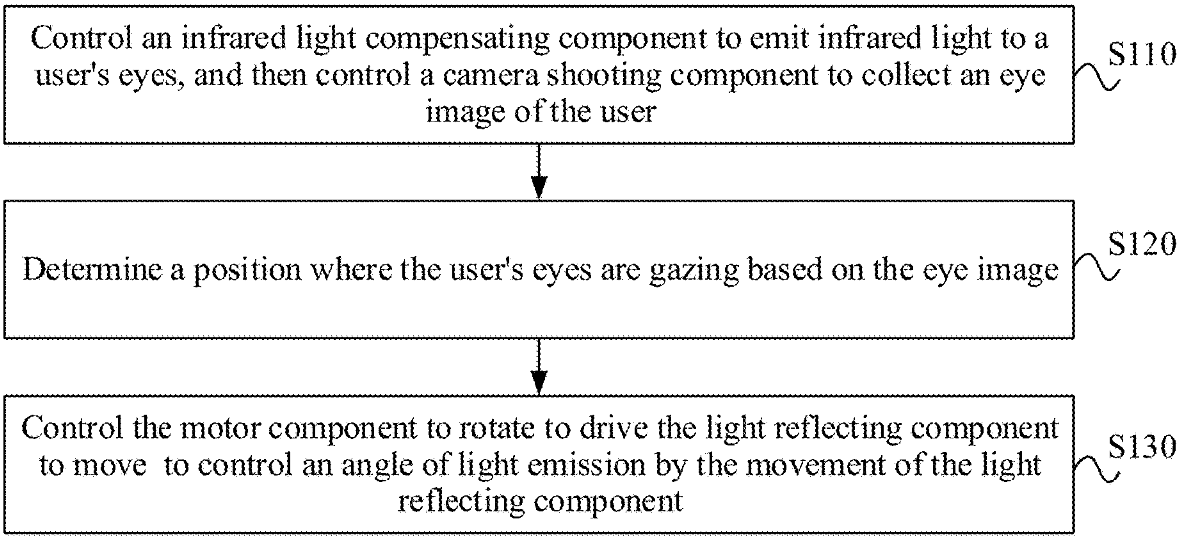
Figure 7:
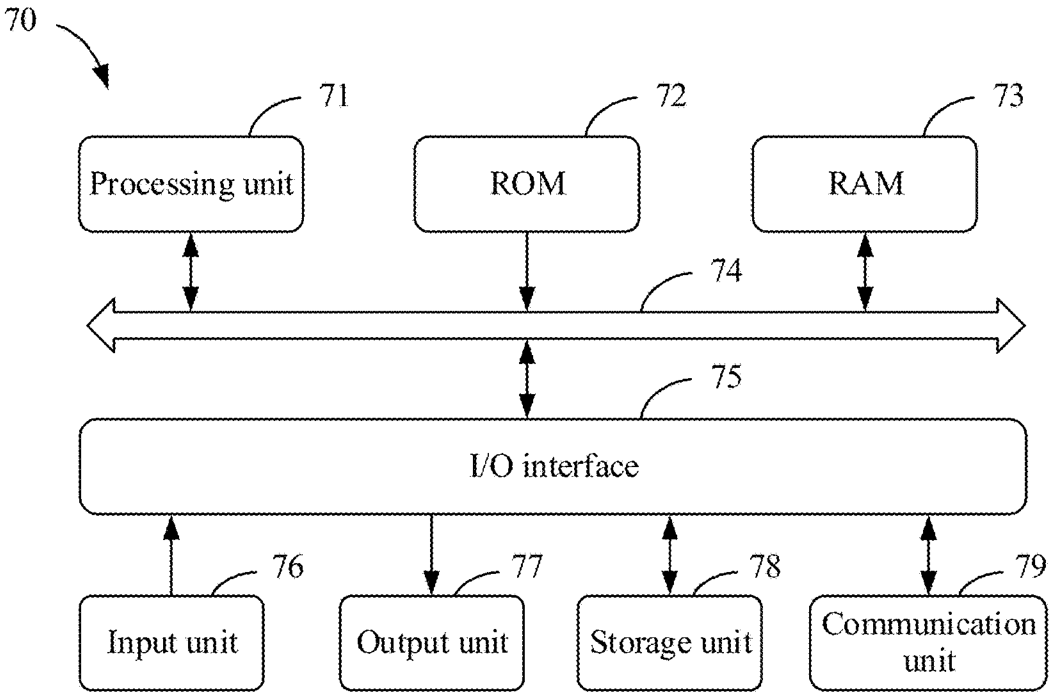

FIG. **5*a*** is a schematic diagram showing a lighting of a lamp according to an embodiment of the present disclosure;

FIG. **5*b*** is a schematic diagram showing another lighting of the lamp according to an embodiment of the present disclosure;

FIG. 6 is a schematic flowchart of a lighting control method according to a fourth embodiment of the present disclosure; and FIG. 7 is a schematic structural diagram of a microprocessor for implementing the lighting control method according to an embodiment of the present disclosure.

DETAILED DESCRIPTION

For enabling the person skilled in the art to better understand the solutions of the present disclosure, the technical solutions in embodiments of the present disclosure are described clearly and completely in conjunction with the drawings in embodiments of the present disclosure. Apparently, the embodiments described below are part, rather than all, of the embodiments of the present disclosure. Based on the embodiments in the present disclosure, all other embodiments obtained by the person skilled in the art on the premise that no creative efforts are made are within the scope of the present disclosure. It is to be appreciated that the various steps recorded in the method embodiment of the present disclosure can be performed in different orders and/or in parallel. In addition, the method embodiment may include additional steps and/or omit to perform the steps shown. The scope of the present disclosure is not limited in this aspect.

The term "including" and its variants used in this article are open-ended, meaning "including but not limited to". The term "based on" refers to "at least partially based on". The term "one embodiment" means "at least one embodiment". The term "another embodiment" means "at least one other embodiment". The term "some embodiments" means "at least some embodiments". The relevant definitions of other terms will be given in the following description.

It is to be noted that the terms "first", "second", and the like in the description, claims and the above drawings of the present disclosure are intended to distinguish between similar objects and are not necessarily used to describe a particular order or sequence. It is to be appreciated that the data used in this way is interchangeable where appropriate so that the embodiments of the present disclosure described herein may also be implemented in a sequence besides those sequences illustrated or described herein. Furthermore, terms such as "include", "have"; and any deformation thereof, are intended to cover non-exclusive inclusion, e.g., a process, method, system, product, or device including a series of steps or units is not necessarily limited to those steps or units expressly listed, but may include other steps or units not expressly listed or inherent to such process, method, system, product or device.

It is to be noted that the modifications of "one" and "multiple" mentioned in the present disclosure are indicative rather than restrictive, and the person skilled in the art should understand that they should be understood as "one or more" unless explicitly stated otherwise in the context.

The names of the messages or information exchanged between multiple devices in the embodiments of the present disclosure are only for illustrative purposes and are not intended to limit the scope of these messages or information.

First Embodiment

Figure 1:
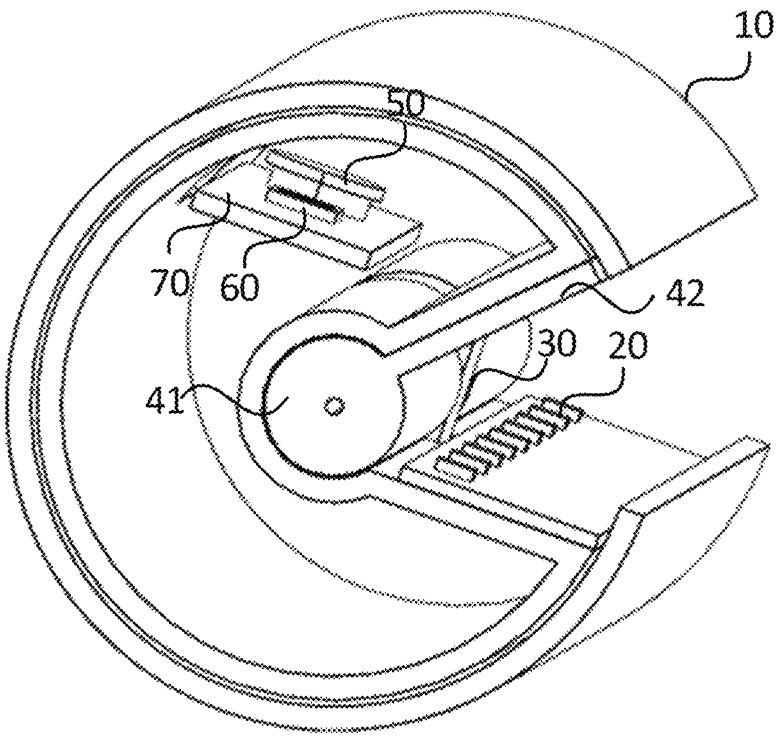
FIG. 1 is a schematic structural diagram of a lamp holder device according to a first embodiment of the present disclosure.

FIG. 1 is a schematic structural diagram of a lamp holder device according to a first embodiment of the present disclosure. The lamp holder device is applicable to a case of lighting for different positions and is suitable for users with different lighting requirements. The lamp holder device can be used independently or fixed to a lamp support for use, and can be implemented by software and hardware.

As shown in FIG. 1, the lamp holder device according to the first embodiment of the present disclosure includes a sector-shaped shell 10, an LED lamp plate 20, a motor component 30, a light reflecting component 40, a camera shooting component 50, an infrared light compensating component 60 and a microprocessor 70.

The LED lamp plate 20 is provided at an opening position of the sector-shaped shell 10, and the motor component 30 is embedded at a center position of the sector-shaped shell 10. The light reflecting component 40 is divided into a circular part 41 and a long plate part 42, the circular part 41 is connected to a center position of the motor component 30, and the length of the long plate part 42 is the same as a radius length of the sector-shaped shell 10. The microprocessor 70 is arranged in the lamp holder device.

The microprocessor 70 determines a rotation angle of the motor component 30 based on the camera shooting component 50 and the infrared light compensating component 60 through the eye tracking technology, and controls the motor component 30 to rotate to drive the light reflecting component 40 to rotate so as to change the angle of light emission.

Specifically, an angular radian of the sector-shaped shell 10 can be any angle within the range of greater than 270 degrees and less than 320 degrees.

Specifically, the camera shooting component 50 can be a component with a camera shooting function, the camera shooting component 50 can be a camera or a CCD camera, and the camera shooting component 50 can receive infrared lights reflected by the human eyes and capture an eye image. The infrared light compensating component 60 can be a component that emits infrared light, and for example, the infrared light compensating component 60 can be an infrared light emitting diode.

Figure 2:
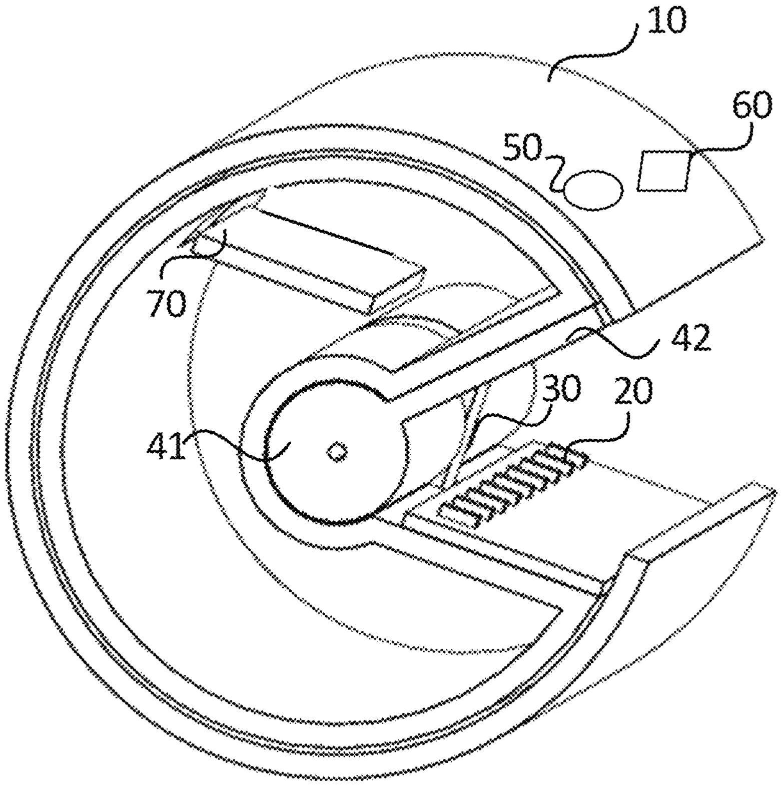
FIG. 2 is a schematic structural diagram of another lamp holder device according to the first embodiment of the present disclosure.

In this embodiment, there are various arrangement positions for arranging the camera shooting component 50 and the infrared light compensating component 60 on the lamp holder device, in one of the arrangement positions as shown in FIG. 1, the camera shooting component 50 and the infrared light compensating component 60 may be arranged inside a front side of the sector-shaped shell 10; in another arrangement position as shown in FIG. 2, the camera shooting component 50 and the infrared light compensating component 60 may be arranged on an outer surface of the front side of the sector-shaped shell 10. FIG. 2 is a schematic structural diagram of another lamp holder device according to the first embodiment of the present disclosure. Considering the aesthetic appearance of the lamp holder device, it is preferable to arrange the camera shooting component 50 and the infrared light compensating component 60 inside the lamp holder device.

Specifically, in a case where the camera shooting component 50 and the infrared light compensating component 60 are arranged inside the lamp holder device, since the material of the sector-shaped shell 10 can transmit infrared light, infrared light emitted by the infrared light compensating component 60 can be transmitted to a user's eye through the sector-shaped lamp shell 10, and infrared light reflected by the user's eye, after passing through the sector-shaped lamp shell 10, is focused by the camera shooting component 50 to form an eye image. In a case where the camera shooting component 50 and the infrared light compensating component 60 are arranged on the front side of the outer surface of the sector-shaped shell 10, infrared light emitted by the infrared light compensating component 60 can be directly emitted to a user's eye, and infrared light reflected by the user's eye is directly focused by the camera shooting component 50 to form an eye image.

In this embodiment, the camera shooting component 50 and the infrared light compensating component 60 are controlled by the microprocessor 70. The camera shooting component 50 and the infrared light compensating component 60 can receive instructions from the microprocessor 70 and perform operations corresponding to the instructions. The camera shooting component 50 can further send a collected eye image to the microprocessor 70. Specifically, the microprocessor 70 can be an operational chip or a microcontroller.

Specifically, the microprocessor 70 can use the eye tracking technology to determine the direction in which the user is gazing, the eye tracking technology is a technology that uses infrared light and a camera to detect a gazing direction of human eyes. After determining the direction in which the user is gazing, the microprocessor 70 can calculate the adjustment angle of the light.

In this embodiment, the microprocessor 70 can adjust a lighting angle of lamplight by controlling the motor component 30 to rotate. Specifically, the rotation of the motor component 30 can drive the light reflecting component 40 to rotate. The light reflecting component 40 can rotate clockwise or counterclockwise within a sector-shaped notch of the sector-shaped shell 10 to change the region of light emission. Specifically, the region of light emission is the region formed between the light reflecting component 40 and the LED lamp plate 20, and changing the size of this region can cause a change in the angle of light emission.

In this embodiment, the lamp holder device is internally provided with a power supply or is provided with a plug-in interface.

Specifically, the lamp holder device can be supplied power in two methods. In a first method: the lamp holder device is internally provided with a power supply for supplying power to its internal components, and in the case where the lamp holder device is internally provided with a power supply, the lamp holder device can be movably used without requiring other devices to supply power to the lamp holder device. In a second method, the lamp holder device is provided with a plug-in interface, and other power source is connected to the lamp holder device through the plug-in interface for supplying power to the lamp holder device, and in the case where the lamp holder device is provided with a plug-in interface, the lamp holder device is required to be fixed to a power supply interface for use.

In the lamp holder device according to the first embodiment of the present disclosure, the microprocessor determines the rotation angle of the motor component based on the camera shooting component and the infrared light compensating component through the eye tracking technology, and controls the motor component to rotate, to drive the light reflecting component to rotate so as to change the angle of light emission. The above lamp holder device can automatically change the lighting region according to the user's gaze direction by controlling the motor component to rotate, to drive the light reflecting component to rotate so as to change the angle of light emission, which can effectively improve the effect of spotlight angle adjustment.

Furthermore, the microprocessor 70 is configured to control the infrared light compensating component 60 to emit infrared light toward a user's eyes, and to control the camera shooting component 50 to capture an eye image of the user, and determine a direction in which the user's eyes are gazing based on the eye image, and determine the rotation angle of the motor component based on the direction.

Specifically, the infrared light compensating component 60 can emit infrared light to a user's eyes after receiving an instruction from the microprocessor 70. When the infrared light shines on the user's eye, a reflection image is formed on a corneal surface of the eye, and the reflection image is called a Purkinje spot. The camera shooting component 50 can collect an eye image after receiving an instruction from the microprocessor 70. Assuming that the user's head remains stationary, as the position of the infrared light compensating component 60 is fixed and the eyeball is an approximate sphere, when the eyeball rotates, it can be considered that the absolute position of the Purkinje spot remains unchanged, and the positions of the iris and pupil are changed correspondingly. In this way, the direction of sightline can be determined based on the relative position relationship between the Purkinje spot formed on the iris by the infrared light and the pupil. Since the grayscale value of the pupil is a minimum and the grayscale value of the Purkinje spot is a maximum, it is easy to find the relative position relationship between the pupil and the Purkinje spot after performing a threshold processing on the eye image, thereby determining the direction in which the user's eyes are gazing.

Specifically, after the direction in which the user's eyes are gazing is determined, an adjustment angle of light can be determined based on a current lighting angle of light, and the adjustment angle of light can be used as the rotation angle of the motor component 30.

In one embodiment, the microprocessor 70 is further configured to control the power supply to supply power to the LED lamp plate to turn on the light when it is detected by the microprocessor 70 that the user is gazing at a preset region and a gazing duration of the user is longer than a preset duration; and control the power supply to power off the LED lamp plate to turn off the light when it is detected by the microprocessor 70 that the user's eyes are not gazing at the preset region.

In this embodiment, the lamp holder device can further automatically detect, through the microprocessor 70, whether the user has gaze behavior, and automatically turn on or turn off the lamp based on the detection results.

Specifically, the preset region can be a region pre-set by the user or developer, and the preset region can be set according to the position at which the lamp holder device is disposed, for example, if the lamp holder device is placed above the computer screen, the preset region can be the computer screen and a desktop region where the screen is located, and if the lamp holder device is placed on the desktop, the preset region can be a desktop region. The preset duration can be pre-set by the user or developer, for example, the preset duration can be three seconds, which can be understood as indicating that the user has gaze behavior and needs to turn on the light when the user's gaze at the preset region is detected to be greater than or equal to three seconds.

An example scenario is that: a computer screen is placed on the desktop, and the lamp holder device is placed above the computer screen. If it is detected that the user is gazing at the desktop below the computer screen for three seconds or more, the light can be automatically turned on and directed towards the desktop. If it is detected that the user is gazing at the desktop below the computer screen for not more than 3 seconds, the light is not required to be turned on, and if the light is in an on state at this time, the light can be turned off.

Second Embodiment

Figure 3:
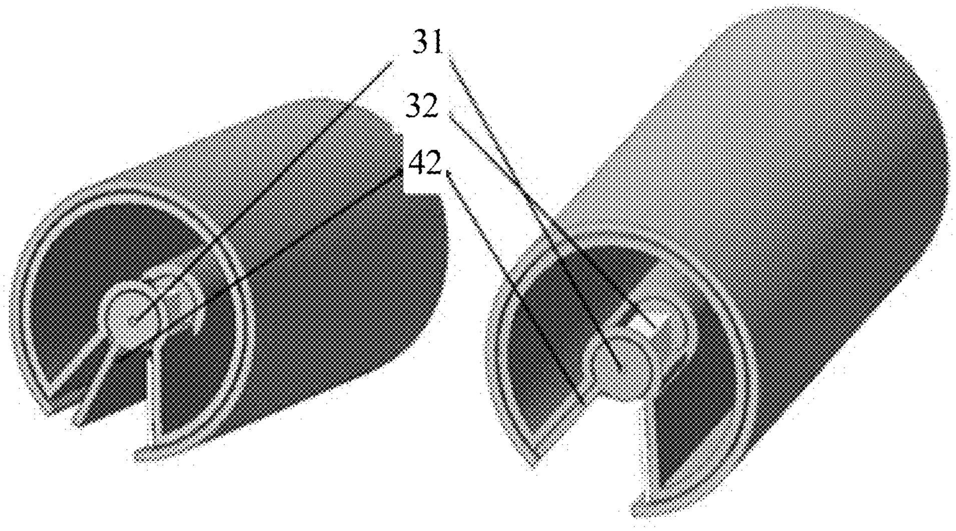
FIG. 3 is a schematic structural diagram of a lamp holder device according to a second embodiment of the present disclosure.

FIG. 3 is a schematic structural diagram of a lamp holder device according to a second embodiment of the present disclosure. In this embodiment, optimization is made based on the above embodiment. Please refer to the first embodiment for the contents of this embodiment that are not yet detailed.

As shown in FIG. 3, the motor component 30 of a lamp holder device according to the second embodiment of the present disclosure is composed of a motor shaft 31 and a motor body 32. The motor body 32 is a cubic structure embedded at a center position of the sector-shaped shell 10, and the motor shaft 31 is arranged at a center position of the motor body 32. The motor shaft 31 has a center position consistent with a center position of the circular part of the light reflecting component 40.

In this embodiment, the microprocessor 70 is configured to control the motor shaft 31 to rotate. When the motor shaft 31 rotates, the motor body 32 drives the light reflecting component 40 to move, and the angle of light emission is controlled by the movement of the light reflecting component 40.

Specifically, a rotating member of the motor component 30 is the motor shaft 31. The rotation of the motor shaft 31 causes the motor body 32 to rotate. The rotation of the motor body 32 can drive the light reflecting component 40 to rotate, and the rotation of the light reflecting component 40 can change the size of an included angle formed between the light reflecting component 40 and a plane in which the LED lamp plate 20 is located, thereby changing the angle of light emission.

Figure 4:
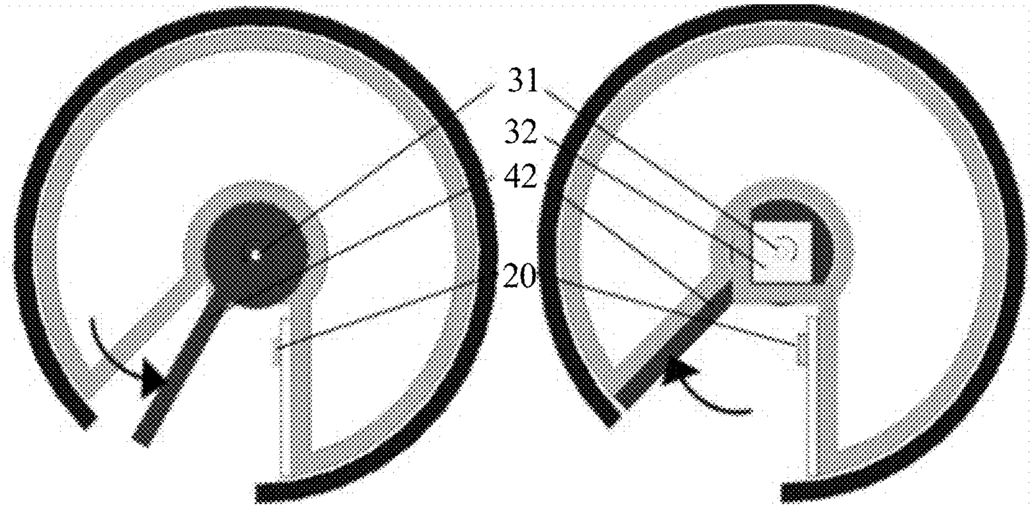
FIG. 4 is a schematic structural diagram of another lamp holder device according to a second embodiment of the present disclosure.

FIG. 4 is a schematic structural diagram of another lamp holder device according to the second embodiment of the present disclosure. As shown in FIG. 4, when the light reflecting component 40 rotates clockwise, an included angle between the light reflecting component 40 and a plane in which the LED lamp plate 20 is located is small, resulting in a reduced region of light emission. When the light reflecting component 40 rotates counterclockwise, an included angle between the light reflecting component 40 and a plane in which the LED lamp plate 20 is located is relatively large, resulting in an increased region of light emission.

The lamp holder device according to the second embodiment of the present disclosure specifies the structure of the motor component 30. In the lamp holder device, the angle at which the light reflecting component reflects light is adjusted by rotating the motor shaft 31, which can achieve better effect of spotlight angle adjustment.

Third Embodiment

A lamp is provided according to a third embodiment of the present disclosure, which includes a lamp holder device according to the first embodiment and the second embodiment of the present disclosure, and further includes a lamp base connected to the lamp holder.

The lamp according to the third embodiment of the present disclosure can be a screen hanging lamp or a desk lamp, which is not specifically limited here.

Specifically, the screen hanging lamp can be hung above the screen for use. The screen hanging lamp, through its unique light directing design, directs the light path towards the desktop below the screen, rather than hitting the screen. Its obvious advantage is that when you need to see the monitor, the qualities of color and image on the screen are not affected by the hanging lamp at all. When eyesight leaves the monitor and two eyes look towards the keyboard or desktop workspace, the screen hanging lamp can provide sufficient brightness.

Specifically, the lamp formed by connecting the lamp holder device to the lamp base can be suitable for various scenarios. The above-mentioned lamp has the functions of the lamp holder device according to any embodiment of the present disclosure, and has the beneficial effects corresponding to the lamp holder device.

Figure 5A:
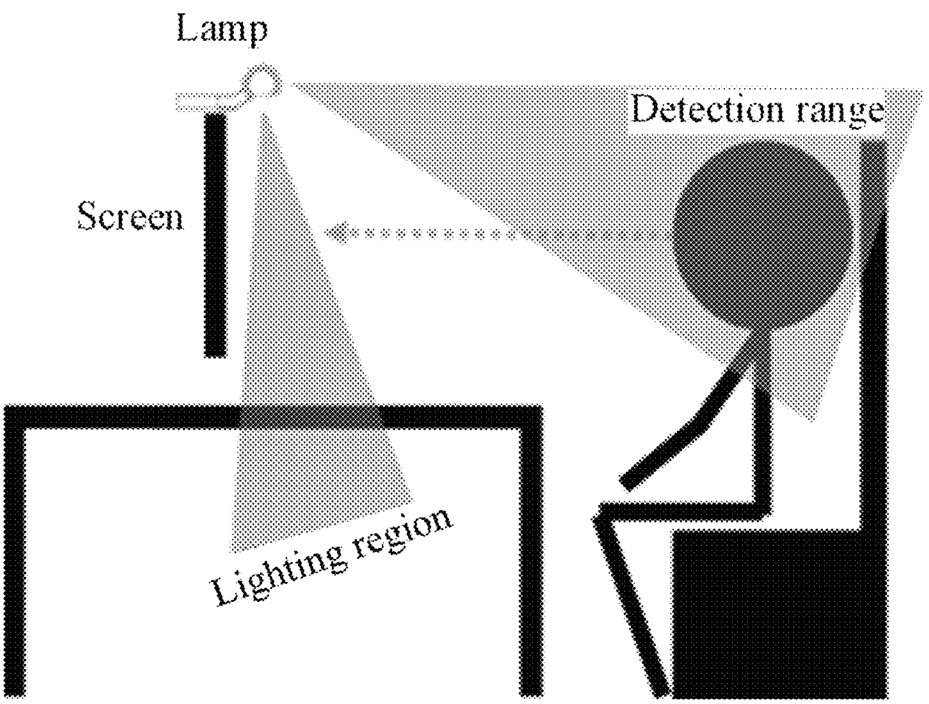
Figure 5B:
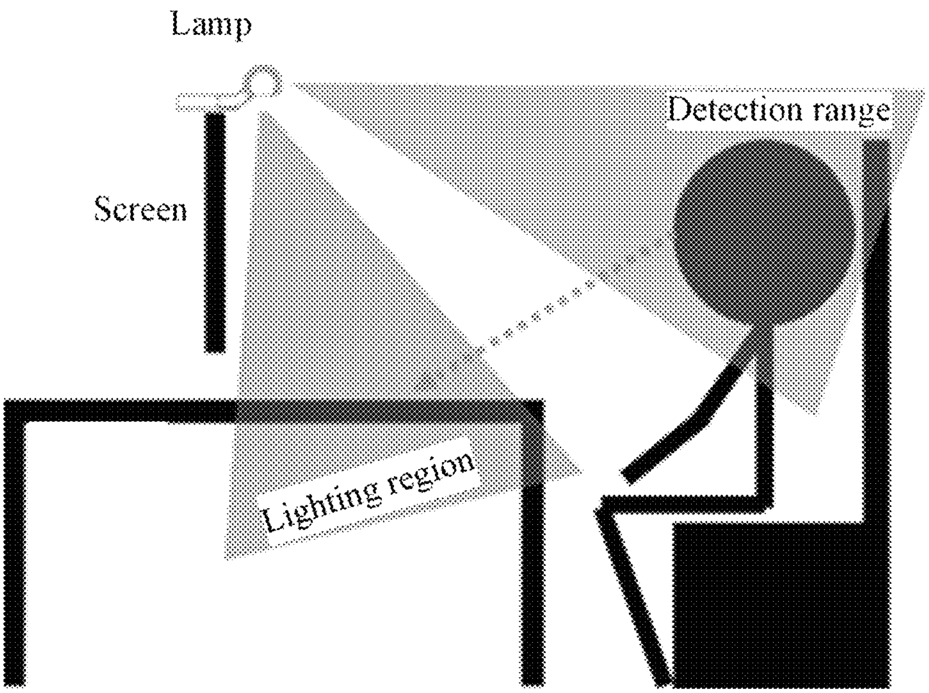

This embodiment of the present disclosure provides a specific implementation based on the technical solutions of the embodiments described above. FIG. 5*a* is a schematic diagram showing a lighting of a lamp according to an embodiment of the present disclosure, while FIG. 5*b* is a schematic diagram showing another lighting of the lamp according to an embodiment of the present disclosure. As shown in FIG. 5*a* and FIG. 5*b*, the screen hanging lamp is placed above the screen, and the screen is placed on the desktop. A larger triangular region is a detection range of the lamp, a smaller triangular region is a lighting region of the lamp, and a dashed arrow indicate a direction of the user's sightline. From the comparison between FIG. 5*a* and FIG. 5*b*, it can be seen that when the user's sightline changes, the lighting angle of the lamp changes.

Fourth Embodiment

FIG. 6 is a schematic flowchart of a lighting control method according to a fourth embodiment of the present disclosure, which can be applied to lighting for different positions. The method can be applied to the lamp holder device and lamp according to the embodiments of the present disclosure for being performed, and is specifically performed by a microprocessor inside the lamp holder device.

As shown in FIG. 6, a lighting control method according to the fourth embodiment specifically includes steps as follows.

In S110, an infrared light compensating component is controlled to emit infrared light to a user's eyes, and then a camera shooting component is controlled to collect an eye image of the user.

Specifically, after receiving an instruction sent by the microprocessor, the infrared light compensating component can emit infrared light to a position of the user's eye based on the instruction, and infrared light reflected by the user's eye is focused by the camera shooting component to form an eye image.

In S120, a position where the user's eyes are gazing is determined based on the eye image.

Specifically, when the infrared light shines on the user's eye, a reflection image is formed on a corneal surface of the eye, and the reflection image is called a Purkinje spot. The camera shooting component can collect an eye image after receiving an instruction from the microprocessor. Assuming that the user's head remains stationary, as the position of the infrared light compensating component is fixed and the eyeball is an approximate sphere, when the eyeball rotates, it can be considered that the absolute position of the Purkinje spot remains unchanged, and the positions of the iris and pupil are changed correspondingly. In this way, the direction of sightline can be determined based on the relative position relationship between the Purkinje spot formed on the iris by the infrared light and the pupil. Since the grayscale value of the pupil is a minimum and the grayscale value of the Purkinje spot is a maximum, it is easy to find the relative position relationship between the pupil and the Purkinje spot after performing a threshold processing on the eye image, thereby determining the direction in which the user's eyes are gazing.

In S130, the motor component is controlled to rotate to drive the light reflecting component to move, and an angle of light emission is controlled through the movement of the light reflecting component.

Specifically, the microprocessor can adjust the lighting angle of lamplight by controlling the rotation of the motor component. Specifically, the rotation of the motor component can drive the light reflecting component to rotate, and the light reflecting component can rotate clockwise or counterclockwise within a sector-shaped notch of the sector-shaped shell 10 to change the region of light emission.

Specifically, a rotating component of the motor component is the motor shaft, the rotation of the motor shaft causes the motor body to rotate. The rotation of the motor body can drive the light reflecting component to rotate, and the rotation of the light reflecting component can change the size of an included angle formed between the light reflecting component and a plane where the LED lamp plate is located, thereby changing the angle of light emission.

In the lighting control method according to the fourth embodiment of the present disclosure, first, the infrared light compensating component is controlled to emit infrared light to the user's eyes, and then the camera shooting component is controlled to collect the user's eye image; then, the position where the user's eyes are gazing is determined based on the eye image; and finally, the motor component is controlled to rotate, to allow the motor component to drive the light reflecting component to move when the motor component rotates, and the angle of light emission is controlled through the movement of the light reflecting component. With the above method, the lighting region can be automatically changed according to the user's gaze direction by controlling the motor component to rotate, to drive the light reflecting component to rotate so as to change the angle of light emission, which can effectively improve the effect of spotlight angle adjustment.

Furthermore, the method further includes as follow. Whether the user is gazing at a preset region is determined based on the position where the user's eyes are gazing; if it is determined that the user is gazing at a preset region and a gazing duration is longer than or equal to a preset duration, the power supply is controlled to supply power to the LED lamp plate to turn on the light; and if it is determined that the user is not gazing at the preset region, the power supply is controlled to power off the LED lamp plate to turn off the light.

In this embodiment, the lamp holder device can also automatically detect, through the microprocessor 70, whether the user has gaze behavior, and automatically turn on or turn off the lamp based on the detection results.

Specifically, the preset region can be a region pre-set by the user or developer, and the preset region can be set according to the position at which the lamp holder device is disposed, for example, if the lamp holder device is placed above the computer screen, the preset region can be the computer screen and a desktop region where the screen is located, and if the lamp holder device is placed on the desktop, the preset region can be a desktop region. The preset duration can be pre-set by the user or developer, for example, the preset duration can be three seconds, which can be understood as indicating that the user has gaze behavior and needs to turn on the light when the user's gaze at the preset region is detected to be greater than or equal to three seconds.

Fifth Embodiment

FIG. 7 shows a schematic structural diagram of a microprocessor 70 that can be used to implement embodiments of the present disclosure. The components shown herein, their connections and relationships, and their functions, are used as examples only, and are not intended to limit implementations of the present disclosure described and/or claimed herein.

As shown in FIG. 7, the microprocessor 70 includes at least one processing unit 71, and a storage unit communicatively connected with the at least one processing unit 71, such as a read-only memory (ROM) 72, a random access memory (RAM) 73, etc., where the storage unit stores a computer program executable by at least one processing unit, and the processing unit 71 can perform various appropriate actions and processes according to a computer program stored in the ROM 72 or a computer program loaded from a storage unit 78 into the RAM 73. In the RAM 73, various programs and data necessary for the operation of the microprocessor 70 may further be stored. The processing unit 71, ROM 72, and RAM 73 are connected to each other through a bus 74. An input/output (I/O) interface 75 is also connected to the bus 74.

Multiple components in the microprocessor 70 are connected to the I/O interface 75, include: an input unit 76, such as a keyboard, a mouse, etc.; an output unit 77, such as an output interface; a storage unit 78, such as a magnetic disk, an optical disk etc.; and a communication unit 79, such as a network card, a modem, a wireless communication transceiver, and the like. The communication unit 79 allows the microprocessor 70 to exchange information/data with other devices through a computer network such as the Internet and/or various telecommunication networks.

The processing unit 71 may be various general and/or special purpose processing units having processing and computing capabilities. Some examples of the processing unit 71 include, but are not limited to, a central processing subunit (CPU), a graphics processing subunit (GPU). The processing unit 71 performs the various methods and processes described above, such as the lighting control method.

In some embodiments, the lighting control method can be implemented as a computer program, which is tangibly contained in a computer-readable storage medium, for example, a storage unit 78. In some embodiments, part or all of the computer program may be loaded and/or installed on the microprocessor 70 via the ROM 72 and/or the communication unit 79. When the computer program is loaded into the RAM 73 and performed by the processing unit 71, one or more steps of the lighting control method described above can be performed. Optionally, in other embodiments, the processing unit 71 may be configured in any other appropriate way (for example, by means of firmware) to perform the lighting control method.

Various implementations of the system and technique described above herein can be implemented in a digital electronic circuit system, an integrated circuit system, a field programmable gate array (FPGA), an application specific integrated circuit (ASIC), application specific standard parts (ASSPs), a system on chip (SOC), a complex programmable logic device (CPLD), a computer hardware, firmware, software, and/or combinations thereof. These various embodiments may include being implemented in one or more computer programs which can be performed and/or interpreted on a programmable system including at least one programmable processor, the programmable processor can be a special-purpose or general-purpose programmable processor, can receive data and instruction from storage system, at least one input device, and at least one output device, and transmit data and instruction to the storage system, the at least one input device, and the at least one output device.

The one or more computer programs for implementing the method of the present disclosure may be written in one programming language or any combination of more programming languages. These computer programs can be provided to a processor of a general-purpose computer, a special-purpose computer or other programmable data processing apparatus, so that the computer programs, when being performed by the processor, causes the functions/operations specified in the flowchart and/or block diagram to be implemented. The computer programs may be performed entirely on the machine, partly on the machine, partly on the machine and partly on a remote machine as a stand-alone software package, or entirely on a remote machine or remote server.

In the context of the present disclosure, a computer readable storage medium may be a tangible medium that may contain or store a computer program for use by an instruction execution system, apparatus or device or use in conjunction with an instruction execution system, apparatus or device. A computer readable storage medium may include, but is not limited to, an electronic, magnetic, optical, electromagnetic, infrared, or semiconductor system, apparatus, or device, or any suitable combination of the foregoing. Optionally, a computer readable storage medium may be a machine readable signal medium. More specific examples of machine-readable storage media would include one or more wire-based electrical connected or portable computer discs, hard drives, random access memory (RAM), read-only memory (ROM), erasable programmable read-only memory (EPROM) or flash memory, optical fiber, compact disk read-only memory (CD-ROM), optical storage, magnetic storage, or any suitable combination of the foregoing.

The systems and techniques described herein can be implemented in a computing system that includes back-end components (e.g., as a data server), or a computing system that includes middleware components (e.g., an application server), or a computing system that includes front-end components (e.g., a user computer having a graphical user interface or web browser through which a user can interact with embodiments of the system and technique described herein), or be implemented in a computing system including any combination of such backend components, middleware components, or front-end components. The components of the system can be interconnected by any form or medium of digital data communication, (e.g., a communication network). Examples of communication network include: local area networks (LANs), wide area network (WAN), blockchain network, and the Internet.

A computing system can include a client and a server. The client and the server are generally remote from each other and typically interact through a communication network. The relationship of the client and the server arises by computer programs running on the respective computers and having a client-server relationship to each other. The server can be a cloud server, also known as a cloud computing server or a cloud host, and is a host product in the cloud computing service system to overcome the drawbacks of difficult management and weak business expansion in traditional physical hosts and virtual private servers VPSs.

It should be appreciated that various forms of flows shown above may be used with the steps reordered, some added, or deleted. For example, the steps in the present disclosure may be performed in parallel, may be performed in sequence, or may be performed in different sequences, which is not limited herein as long as the expected result of the technical solutions of the present disclosure can be realized.

The above-mentioned embodiments do not constitute a limitation on the protection scope of the present disclosure. It is to be appreciated by the person skilled in the art that various modifications, combinations, sub-combinations, and substitutions may be made according to design requirements and other factors. Any modifications, equivalent substitutions, improvements and the like within the spirit and principle of the present disclosure shall fall within the protection scope of the present disclosure.

What is claimed is:

1. A lamp holder device, comprising a sector-shaped shell, an LED lamp plate, a motor component, a light reflecting component, a camera shooting component, an infrared light compensating component and a microprocessor, wherein the LED lamp plate is provided at an opening position of the sector-shaped shell, and the motor component is embedded at a center position of the sector-shaped shell, the light reflecting component comprises a circular part and a long plate part, the circular part is connected to a center position of the motor component, and a length of the long plate part is same as a radius length of the sector-shaped shell; and the microprocessor is arranged in the lamp holder device; and the microprocessor is configured to determine a rotation angle of the motor component based on the camera shooting component and the infrared light compensating component through an eye tracking technology, and control the motor component to rotate to drive the light reflecting component to rotate so as to change an angle of light emission.

2. The lamp holder device according to claim 1, wherein the camera shooting component and the infrared light compensating component are both arranged inside a front side of the sector-shaped shell or on an outer surface of the front side of the sector-shaped shell.

3. The lamp holder device according to claim 1, wherein the microprocessor is configured to control the infrared light compensating component to emit infrared light toward a user's eyes, and control the camera shooting component to capture an eye image of the user, and determine a direction in which the user's eyes are gazing based on the eye image, and determine the rotation angle of the motor component based on the direction.

4. The lamp holder device according to claim 1, wherein a material of the sector-shaped shell is capable of transmitting infrared light.

5. The lamp holder device according to claim 1, wherein the motor component comprises a motor shaft and a motor body, the motor body is a cubic structure embedded at the center position of the sector-shaped shell, the motor shaft is arranged at a center position of the motor body, and the motor shaft has a center position consistent with a center position of the circular part of the light reflecting component.

6. The lamp holder device according to claim 5, wherein the microprocessor is configured to control the motor shaft to rotate to enable the motor body to drive the light reflecting component to move to control the angle of light emission by a movement of the light reflecting component.

7. The lamp holder device according to claim 1, wherein the lamp holder device is internally provided with a power supply or is provided with a plug-in interface.

8. The lamp holder device according to claim 1, wherein the microprocessor is further configured to control a power supply to supply power to the LED lamp plate to turn on the light in response to detecting that the user is gazing at a preset region and a gazing duration of the user is longer than or equal to a preset duration; and control the power supply to power off the LED lamp plate to turn off the light in response to detecting that the user's eyes are not gazing at the preset region.

9. The lamp holder device according to claim 1, wherein an angular curvature of the sector-shaped shell is greater than 270 degrees and less than 320 degrees.

10. A lamp, comprising a lamp holder device and a lamp base;

wherein the lamp holder device comprising a sector-shaped shell, an LED lamp plate, a motor component, a light reflecting component, a camera shooting component, an infrared light compensating component and a microprocessor;

wherein the LED lamp plate is provided at an opening position of the sector-shaped shell, and the motor component is embedded at a center position of the sector-shaped shell, the light reflecting component comprises a circular part and a long plate part, the circular part is connected to a center position of the motor component, and a length of the long plate part is same as a radius length of the sector-shaped shell; and the microprocessor is arranged in the lamp holder device; and the microprocessor is configured to determine a rotation angle of the motor component based on the camera shooting component and the infrared light compensating component through an eye tracking technology, and control the motor component to rotate to drive the light reflecting component to rotate so as to change an angle of light emission.

11. The lamp according to claim 10, wherein the microprocessor is configured to control the infrared light compensating component to emit infrared light toward a user's eyes, and control the camera shooting component to capture an eye image of the user, and determine a direction in which the user's eyes are gazing based on the eye image, and determine the rotation angle of the motor component based on the direction.

12. The lamp according to claim 10, wherein the motor component comprises a motor shaft and a motor body, the motor body is a cubic structure embedded at the center position of the sector-shaped shell, the motor shaft is arranged at a center position of the motor body, and the motor shaft has a center position consistent with a center position of the circular part of the light reflecting component.

13. The lamp according to claim 12, wherein the microprocessor is configured to control the motor shaft to rotate to enable the motor body to drive the light reflecting component to move to control the angle of light emission by a movement of the light reflecting component.

14. The lamp according to claim 10, wherein the microprocessor is further configured to control a power supply to supply power to the LED lamp plate to turn on the light in response to detecting that the user is gazing at a preset region and a gazing duration of the user is longer than or equal to a preset duration; and control the power supply to power off the LED lamp plate to turn off the light in response to detecting that the user's eyes are not gazing at the preset region.

15. A lighting control method, applied to a lamp holder device, wherein the lamp holder device comprising a sector-shaped shell, an LED lamp plate, a motor component, a light reflecting component, a camera shooting component, an infrared light compensating component and a microprocessor;

wherein the LED lamp plate is provided at an opening position of the sector-shaped shell, and the motor component is embedded at a center position of the sector-shaped shell, the light reflecting component comprises a circular part and a long plate part, the circular part is connected to a center position of the motor component, and a length of the long plate part is same as a radius length of the sector-shaped shell; and the microprocessor is arranged in the lamp holder device; and the microprocessor is configured to determine a rotation angle of the motor component based on the camera shooting component and the infrared light compensating component through an eye tracking technology, and control the motor component to rotate to drive the light reflecting component to rotate so as to change an angle of light emission;

the method being performed by the microprocessor within the lamp holder device, and the method comprising:

controlling the infrared light compensating component to emit infrared light toward a user's eyes, and then controlling a camera shooting component to collect an eye image of the user;

determining a position where the user's eyes are gazing based on the eye image;

determining a rotation angle of the motor component based on the position; and controlling the motor component to rotate to drive the light reflecting component to move, so as to change an angle of light emission.

16. The method according to claim 15, further comprising:

determining whether the user is gazing at a preset region according to a position where the user's eyes are gazing;

in response to determining that the user is gazing at a preset region and a gazing duration of the user is longer than or equal to a preset duration, controlling the power supply to supply power to the LED lamp plate to turn on the light; and in response to determining that the user is not gazing at the preset region, controlling the power supply to power off the LED lamp plate to turn off the light.

17. The method according to claim 15, wherein the camera shooting component and the infrared light compensating component are both arranged inside a front side of the sector-shaped shell or on an outer surface of the front side of the sector-shaped shell.

18. The method according to claim 15, wherein a material of the sector-shaped shell is capable of transmitting infrared light.

19. The method according to claim 15, wherein the motor component comprises a motor shaft and a motor body, the motor body is a cubic structure embedded at the center position of the sector-shaped shell, the motor shaft is arranged at a center position of the motor body, and the motor shaft has a center position consistent with a center position of the circular part of the light reflecting component.

20. The method according to claim 19, wherein the microprocessor is configured to control the motor shaft to rotate to enable the motor body to drive the light reflecting component to move to control the angle of light emission by a movement of the light reflecting component.

* * * * *